Figure 1:
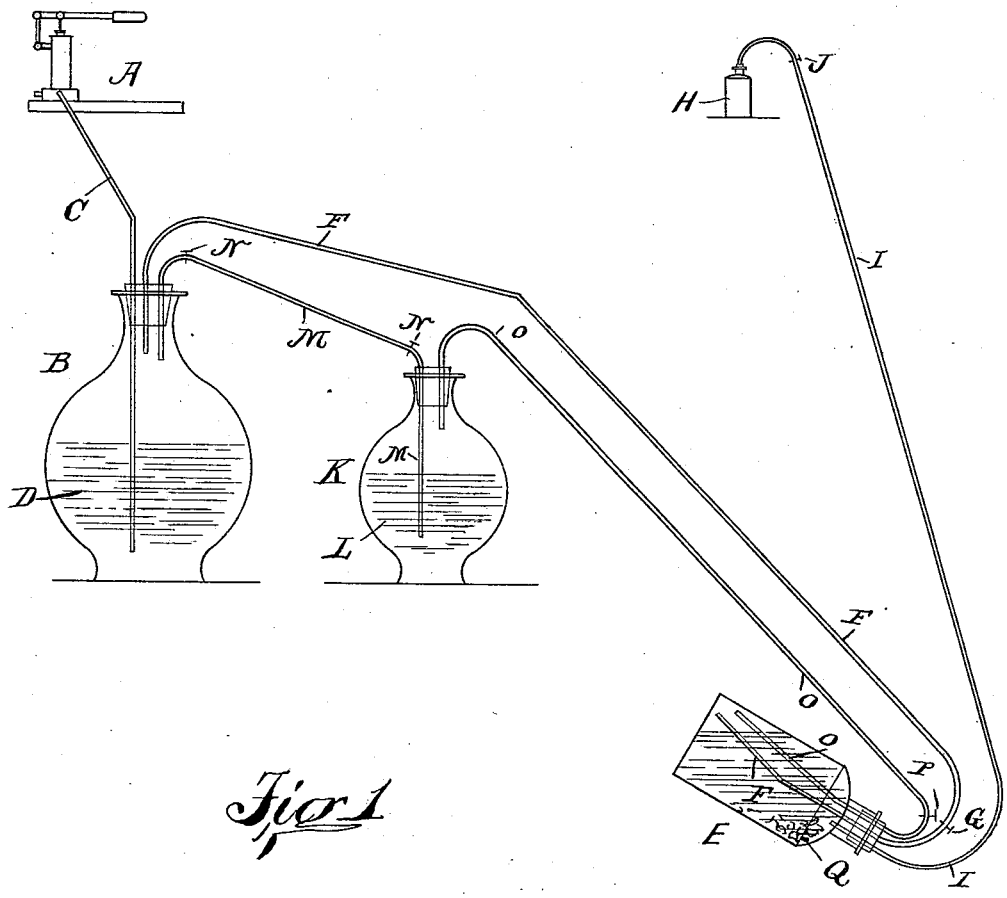

(No Model.) 2 Sheets—Sheet 1.

E. SCHMITT.
METHOD OF AND APPARATUS FOR MANUFACTURING FERMENTED LIQUORS.
No. 277,065. Patented May 8, 1883.

WITNESSES:
Geo P. Tangeman
Ezra Cope

Emile Schmitt INVENTOR
by James W. See
ATTORNEY (No Model.) 2 Sheets—Sheet 2.
E. SCHMITT.
METHOD OF AND APPARATUS FOR MANUFACTURING FERMENTED LIQUORS.
No. 277,065. Patented May 8, 1883.
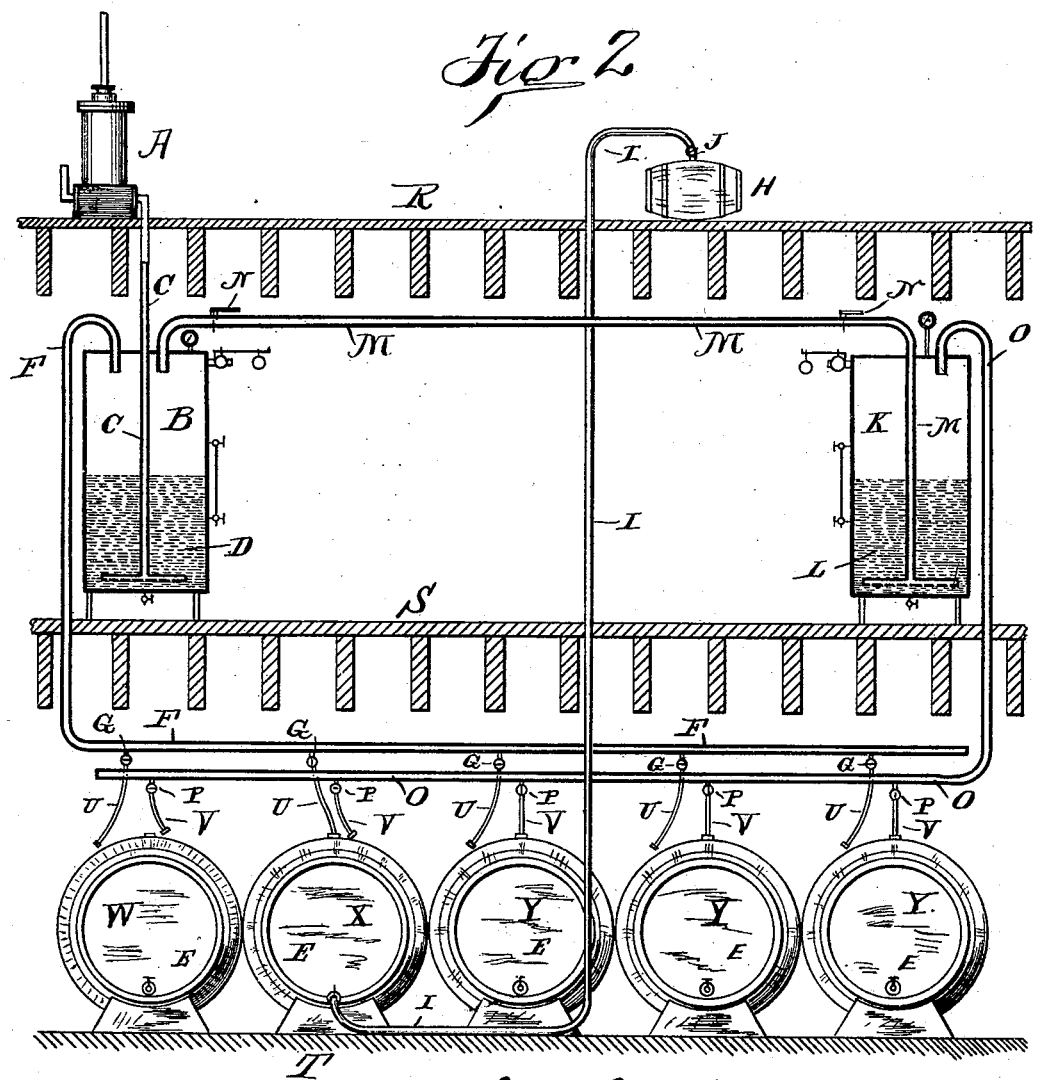

UNITED STATES PATENT OFFICE.

EMILE SCHMITT, OF CINCINNATI, OHIO.

METHOD OF AND APPARATUS FOR MANUFACTURING FERMENTED LIQUORS.

SPECIFICATION forming part of Letters Patent No. 277,065, dated May 8, 1883.

Application filed February 10, 1883. (No model.)

*To all whom it may concern:*

Be it known that I, EMILE SCHMITT, of Cincinnati, Hamilton county, Ohio, have invented certain new and useful Improvements in Methods of and Apparatus for Manufacturing Fermented Liquors, of which the following is a specification.

This invention pertains to method and means for treating fermented liquors during the process of what I will call the "secondary action" of the liquor. Taking beer as a liquor, and taking the clarifying and second fermentation with added young beer as the secondary action, I cause such action to occur under a controlled pressure of purified air. The said fermentation and the said clarification may, either alone or together, constitute the secondary action to which I refer, in connection with the liquor chosen for illustration. Treatment by my improved method and means results in an increased quantity of carbonic-acid gas being retained, and in an improved sparkle and life to the liquor. In the apparatus I also arrange for the combination, with the essential means for applying and controlling said air-pressure, of apparatus aiding in the process of racking off under air-pressure.

I illustrate in Figure 1 a simple laboratory device embodying important features of my invention, and serving for an easily-comprehended description, and in Fig. 2 I illustrate a complete apparatus indicating the practical working of the method in a brewery.

I will first confine my description to Fig. 1 of the accompanying drawings, in which A represents an air-pump; B, an air-reservoir; C, a pipe connecting them, with its lower end under water, D, in the reservoir; E, a vessel in which the liquor—beer being taken as an example—is to be manufactured; F, a pipe having cock G, and leading from air in reservoir B to space in vessel E, above the liquor in the vessel E; H, the final receiving-vessel for the finished beer, the vessel being on a higher level than the making-vessel E; I, a pipe, with cock J, from the liquor in the making-vessel E to the final receiver H; K, a second air-reservoir with water L, and a pipe, M, having cocks N, connecting it with air in reservoir B, the pipe M discharging beneath the water in the second reservoir, K; O, a pipe, with cock P, connecting air-spaces in second reservoir, K, and in making-vessel E; and Q, isinglass or other clarifying matter placed in liquor in vessel E.

Let there be in making-vessel E some beer liquor, some young beer, and the clarifier Q. A second fermentation and clarification will take place, after which the finished beer may be placed in final receivers for shipment. All cocks being closed, air is pumped into reservoir B, which I will call the "high" reservoir, to, say, a pressure of fifty pounds. If cock G should be opened wide, this full pressure of air would act above the liquor in the making-vessel E, and would so disturb its contents as to muddy it and defeat attempts to clarify it. The cock G is not to be opened at present. By experiment it is determined what pressure can be applied to the making-vessel without damage—say it is five pounds. Cocks N are opened and the compressed air throttled by the cocks N is allowed to enter the low reservoir K till that reservoir is under a pressure of five pounds, after which cocks N are tightly closed. Cock P is now opened and the liquor in action in the making-vessel E is subjected to the air-pressure of five pounds. The air-space in vessel E above the liquor becomes filled with the compressed air, and the carbonic-acid gas generated within the liquor becomes confined to the liquor, so as to form a part of it upon its completion of treatment. The air from the air-pump is purified to some degree by passage through water in high reservoir, and this air is again purified through water in the low reservoir K before reaching the making-vessel E. The secondary action goes on in the making-vessel E under the five-pound air-pressure until the clarification and fermentation is properly completed and the beer ready for the final receiver. When ready, cock P is closed and cock G opened, thus permitting air at, say, fifty-pounds pressure to act upon the beer. This heavy pressure, so damaging before, has not the same evil effect on the completed beer. Cock J being opened, the beer will be forced up pipe I into the receiver H, or as many of them as requisite. If the height of the column in pipe I should not require an excessive pressure to raise it, the pressure from the low reservoir may be utilized to lift the beer.

In Fig. 2 the same general arrangement of parts will be recognized and identified by similar letters of reference. R, S, and T represent three floors of a brewery. The final receiver H is here a beer-keg. Instead of a single making-vessel E, several of the usual casks are seen, and the low-pressure pipe O is arranged to be connected with any of them at will, or with all of them, by flexible branches V. In a similar manner the high-pressure pipe F is provided with flexible branches U. The lift-hose I may connect with any of the casks. The three casks (marked Y) are undergoing the secondary action under low air-pressure through branches V, which are connected. Cask X contains a finished product, and, under high air-pressure, is sending its contents to the keg H. Cask W has been finished and its contents sent above. Both air-pipes are disconnected. As a new cask is prepared for the secondary action it is connected to the pipe O, and the low air-pressure let on, and the low pressure is maintained by proper drafts upon the high reservoir through pipe M. Safety-valves, pressure-gages, water-gages, man-holes, discharge-cocks, &c., should be fitted to each reservoir. Instead of flexible pipes U and V, to be used by being connected alternately, permanent connections may of course be provided, as indicated in Fig. 1, and, if desired, a single terminal having a three-way cock may apply to each pair of branches U V. Proper reducing-valves may be introduced into the pipes when needed to avoid the necessity for watchfulness in regulating the low pressure from the higher pressure.

I claim as my invention—

1. The method of treating fermented liquors, which consists in placing the liquor, together with matter to clarify it, or matter to produce a new fermentation, or both, in a tight vessel and applying and maintaining above the liquor purified and compressed air at low pressure, substantially as and for the purpose specified.

2. The method of treating fermented liquors, which consists in placing the liquor, together with matter to clarify it, or matter to produce a new fermentation, or both, in a tight vessel and applying above the liquor purified and compressed air at a low pressure, as set forth, and subsequently, upon proper completion of such clarification or fermentation, or both, applying above the liquor purified and compressed air at a higher pressure, substantially as and for the purpose specified.

3. The combination of the making-vessel containing fermented liquor and matter to clarify it, or matter to produce a new fermentation, or both, a reservoir of purified compressed air at low pressure connected with said making-vessel, and a source of supply of compressed air connected with said reservoir, substantially as and for the purpose specified.

4. The combination of the making-vessel, the high-pressure air-reservoir, the low-pressure air-reservoir, the source of compressed-air supply, the final discharge-pipe, and the connections and cocks for control, substantially as and for the purpose specified.

5. The combination of the series of making-vessels, the high-pressure air-reservoir, the low-pressure air-reservoir, the source of compressed-air supply, the final discharge-pipe, and the connections and cocks for control, substantially as and for the purpose specified.

EMILE SCHMITT.

Witnesses:
J. W. SEE,
ISRAEL WILLIAMS.